(12) United States Patent
Vitebsky et al.

(10) Patent No.: US 7,788,566 B2
(45) Date of Patent: Aug. 31, 2010

(54) SYSTEM AND METHOD FOR DYNAMICALLY ADJUSTING HYBRID ARQ TRANSMISSIONS

(75) Inventors: Stan Vitebsky, Morristown, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 965 days.

(21) Appl. No.: 11/334,608

(22) Filed: Jan. 18, 2006

(65) Prior Publication Data
US 2007/0168822 A1 Jul. 19, 2007

(51) Int. Cl.
*G08C 25/02* (2006.01)
*H04L 1/18* (2006.01)

(52) U.S. Cl. .................................... 714/748
(58) Field of Classification Search .............. 714/18, 714/748–750
See application file for complete search history.

(56) References Cited

U.S. PATENT DOCUMENTS

| | | | |
|---|---|---|---|
| 5,487,068 A * | 1/1996 | Smolinske et al. | 370/450 |
| 5,710,981 A | 1/1998 | Kim et al. | 455/69 |
| 5,828,677 A * | 10/1998 | Sayeed et al. | 714/774 |
| 6,011,973 A | 1/2000 | Valentine et al. | 455/456 |
| 6,625,133 B1 | 9/2003 | Balachandran et al. | |
| 6,662,019 B2 | 12/2003 | Kamel et al. | |
| 6,842,441 B2 | 1/2005 | Balogh et al. | |
| 6,859,446 B1 | 2/2005 | Gopalakrishnan et al. | |
| 6,925,057 B2 | 8/2005 | Cheng et al. | |
| 6,944,449 B1 | 9/2005 | Gandhi et al. | |
| 6,968,201 B1 | 11/2005 | Gandhi et al. | |
| 6,975,611 B1 | 12/2005 | Balachandran et al. | |
| 7,076,379 B2 | 7/2006 | Lee et al. | 370/335 |
| 7,136,665 B2 | 11/2006 | Ida et al. | 455/522 |
| 7,372,834 B2 | 5/2008 | Kim et al. | 370/331 |
| 7,430,436 B2 | 9/2008 | Nakao | 455/522 |
| 7,464,166 B2 | 12/2008 | Larsson et al. | 709/228 |
| 7,573,838 B2 | 8/2009 | Miyoshi et al. | 370/278 |
| 2003/0223429 A1 | 12/2003 | Bi et al. | |
| 2004/0174846 A1 | 9/2004 | Kwon et al. | |
| 2004/0179493 A1 * | 9/2004 | Khan | 370/332 |
| 2004/0203822 A1 | 10/2004 | Vitebsky | |
| 2005/0058154 A1 | 3/2005 | Lee et al. | 370/335 |
| 2005/0243855 A1 | 11/2005 | Dominique et al. | 370/441 |
| 2007/0147331 A1 | 6/2007 | Bi et al. | 370/328 |

OTHER PUBLICATIONS

Zhou et al., Optimum sub-packet transmission for turbo-coded hybrid ARQ systems, 2003, IEEE . 3080-3084.*

(Continued)

*Primary Examiner*—Shelly A Chase
(74) *Attorney, Agent, or Firm*—Harness, Dickey & Pierce, P.L.C.

(57) ABSTRACT

There is provided a system and method for dynamically adjusting the maximum number of hybrid ARQ transmissions in a wireless system. More specifically, in one embodiment, there is provided a method comprising generating a plurality of hybrid ARQ sub-packets associated with a packet, wherein a transmitter is configured to transmit up to a maximum number of the hybrid ARQ sub-packets, detecting a degradation in transmission quality that affects the transmitter, and reducing the maximum number of hybrid ARQ sub-packets associated with the packet that can be transmitted by the transmitter in response to detecting the degradation.

22 Claims, 3 Drawing Sheets

OTHER PUBLICATIONS

Wen et al., Channel adaptive Hybrid ARQ/FEC for robust video transmission over 3G, 2005, IEEE, p. 1-5.*

Rao et al., Resource allocation and fairness for downlink shared data channels, 2003, IEEE, p. 1049-1054.*

U.S. Office Action dated Apr. 28, 2010 for U.S. Appl. No. 11/318,483.

* cited by examiner

SYSTEM AND METHOD FOR DYNAMICALLY ADJUSTING HYBRID ARQ TRANSMISSIONS

BACKGROUND OF THE INVENTION

1. Field of the Invention

The present invention relates generally to telecommunications and, more particularly, to managing hybrid automatic repeat request ("H-ARQ") transmissions in a wireless communication system.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

One of the paramount challenges facing modern wireless telephone systems is the rapid growth of consumer demand for data services such as Internet access, text messaging, and e-mail. In fact, consumers are demanding greater access to data-related services than ever before, and this trend is not likely to change. For example, in the coming years, consumers will likely expect their wireless telephones to provide many, if not all, of the communication features currently provided by computers (e.g., video conferencing, picture mail, etc.).

Unfortunately, building or upgrading the telecommunication infrastructure to support growing consumer demand is relatively expensive. As such, much research has been invested into determining better and more efficient methods for transmitting information over existing infrastructure. One technique, known as Hybrid Automatic Repeat Request ("Hybrid ARQ") is employed in many wireless systems (for example, Evolution-Data Optimized ("EVDO") Evolution-Data and Voice ("EVDV"), and High Speed Downlink Packet Access ("HSDPA")) to increase data throughput or transmission efficiency.

Typical Hybrid ARQ systems work in the following manner. First, information and/or data is encoded with some amount of redundancy and packetized into encoded packets. The encoded packets are then segmented in multiple sub-packets (four, for example). The encoding, redundancy and segmentation are typically designed in such a way that the transmission of any number of sub-packets could result in successful reception of the entire information. For example, if the encoded packet is split into four sub-packets, the reception of just one, two, or three sub-packets may be enough to successfully decode the entire packet.

To take advantage of Hybrid ARQ operation, a receiver provides "fast" feedback after every sub-packet to indicate the status of the packet reception. More specifically, if the packet cannot be decoded after processing a particular sub-packet, the receiver may send an explicit or implicit non-acknowledgement ("NAK") to the transmitter. In response to NAK, a conventional transmitter will continue sending additional sub-packets until all of the sub-packets are transmitted or an acknowledgement ("ACK") is received by the transmitter.

As described above, due to the encoding and the redundancy of the above-described sub-packets, all of the data in a particular packet may be transmitted without transmitting all of the sub-packets. As such, once the ACK has been received, the transmitter can stop trying to transmit the remaining sub-packets. This condition is sometimes referred as "early termination." Early termination may increase system throughput or capacity, because the slots/frames that would have been used by the remaining sub-packets can be used to send different information.

One or more of the embodiments disclosed below may be directed toward improvements to H-ARQ systems.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

There is provided a system and method for dynamically adjusting the maximum number of hybrid ARQ transmissions in a wireless system. More specifically, in one embodiment, there is provided a method comprising generating a plurality of hybrid ARQ sub-packets associated with a packet, wherein a transmitter is configured to transmit up to a maximum number of the hybrid ARQ sub-packets, detecting a degradation in transmission quality that affects the transmitter, and reducing the maximum number of hybrid ARQ sub-packets associated with the packet that can be transmitted by the transmitter in response to detecting the degradation.

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

Figure 1:
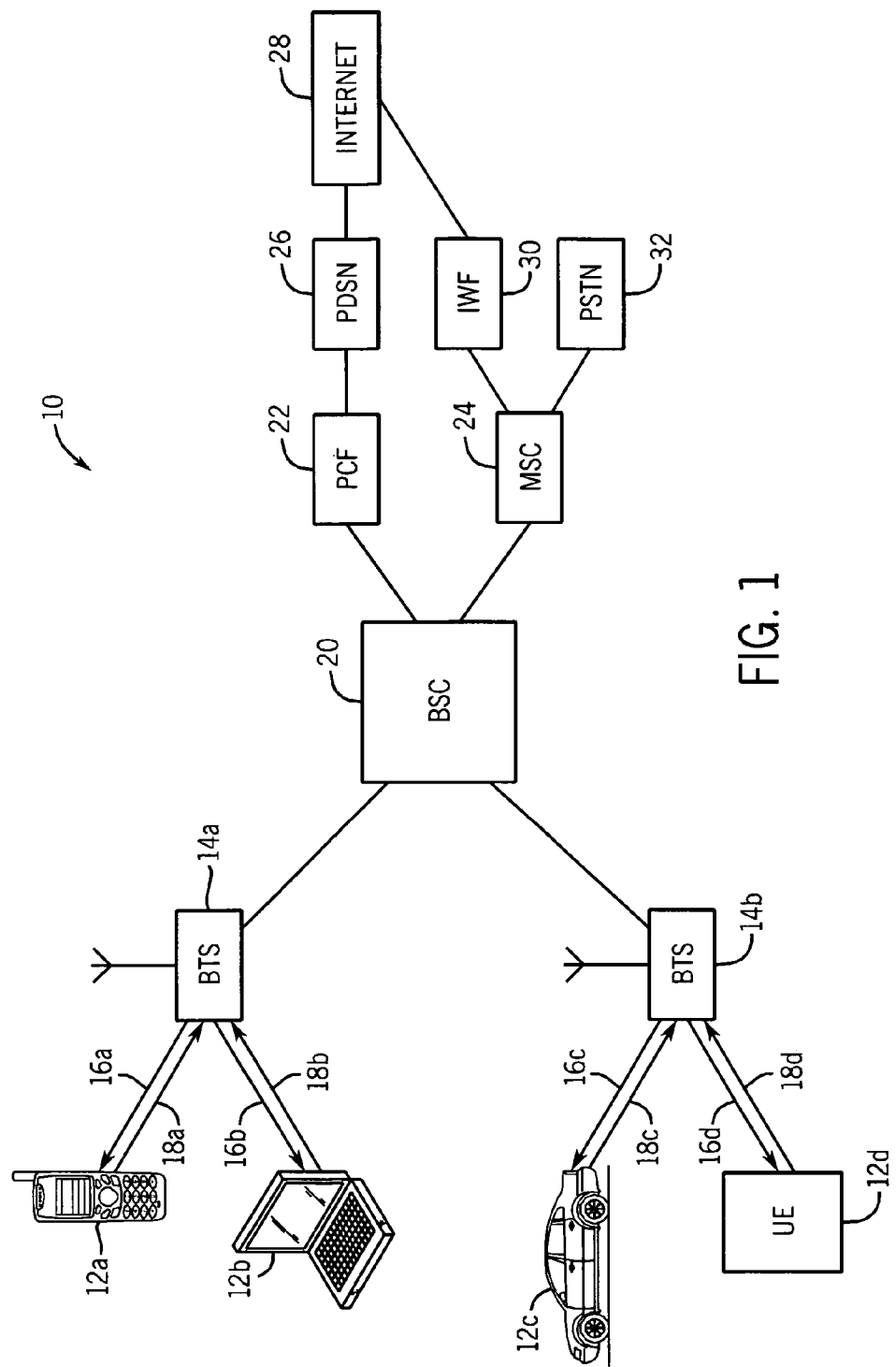
FIG. 1 is a block diagram of an exemplary wireless telephone/data system in accordance with one embodiment.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, Hybrid ARQ can increase the throughput or capacity of a wireless telephone/data system. However, when Hybrid ARQ is used to send information having strict quality of service ("QoS") latency requirements, such as voice-over-IP ("VoIP") or interactive video, several issues may arise in conventional H-ARQ systems. For example, if an application, such as VoIP, generates new packets at a rate of one new packet after every N sub-packet transmission periods T, the transmitter has to successfully transmit the packet using N sub-packets or less to avoid having to queue the new packets. If the radio frequency ("Rf") conditions are normal, packets can typically be transmitted successfully and the ACKs are received by the transmitter in N or less sub-packets. However, when the Rf conditions are degraded, the packets may not be successfully transmitted in less then N sub-packets.

Alternatively, the packets may be successfully transmitted to the receiver in less than N sub-packets, but the ACKs from the receiver may not reach the transmitter. It will be appreciated that the ACKs may be transmitted using less power than is used to transmit the packet itself and/or the RF conditions on the feedback link which is used to transmit ACKs may be worse than the RF conditions on the direct link used to transmit the packet, and, as such, the ACKs may be susceptible to loss even when the packet itself is successfully transmitted. In this situation, conventional transmitters are configured to treat the lack of either an ACK or a NAK as a NAK. Accordingly, even though the receiver successfully decoded the packet, a conventional transmitter, having not received an ACK, will continue to transmit sub-packets.

Regardless of the cause, if the maximum number of allowed Hybrid ARQ transmissions (M) is higher than N and early termination is not performed by the Nth sub-packet, newly generated packets may have to be queued at the transmitter until the previous packet is transmitted. In the worst case, the next packet would have to wait until the transmission of the Mth sub-packet of the previous packet. Disadvantageously, this persistent queuing in conventional systems may result in significant quality degradation, as queued packets may be dropped.

Under normal transmission conditions, the Hybrid ARQ transmission parameters (such as the sub-packet transmission power or data rate) are statically configured and/or adjusted via closed loop power and/or transmission rate control to ensure that the early termination is achieved on average faster than new packets are generated. For example, it is possible to configure power and rate control parameters in such a way that the probability of exceeding the number of N sub-packet transmissions has a low target of around 1%. The ability to occasionally send more than N sub-packets adds a benefit of increased reliability (because the final packet error rate after M transmissions is much less than 1%) and does not degrade the delay and jitter as long as N is not exceeded too often. This benefit, however, can only be achieved if the feedback channel transmitting ACK/NAK information is reliable or if the power and rate control are capable of meeting the performance target.

However, under degraded RF conditions or in system that is overloaded, the performance of ACK/NAK feedback may degrade beyond the point sufficient to keep the number of sub-packet transmissions within the limits necessary to avoid queuing. Also, the degraded RF conditions and/or overload could result in the inability of power and/or rate control itself to keep the number of sub-packet transmissions below N at a low enough target level.

Accordingly, one or more of the embodiments described below may be directed towards a system and/or method for dynamically adjusting the number of hybrid automatic repeat requests ("Hybrid ARQ" or "H-ARQ"). More specifically, one or more of the embodiments described herein may be directed towards a wireless transmitter and/or receiver configured to detect a degradation in transmission quality due to degradation in radio frequency ("Rf") conditions or other reasons and to limit or initiate a limitation in the maximum number of Hybrid ARQ sub-packets that are transmitted for each packet.

Turning now to the drawings and looking initially at FIG. 1, a block diagram of an exemplary wireless telephone/data system in accordance with one embodiment is illustrated and generally designated by a reference numeral 10. Those of ordinary skill in the art will appreciate that the wireless telephone system 10, described below, illustrates merely one embodiment of an Evolution-Data Optimized ("EV-DO") wireless telephone/data system 10 configured to dynamically adjust Hybrid ARQ transmissions. In alternate embodiments, other suitable EV-DO configurations may be employed in the system 10. Moreover, the techniques described herein may also be employed in a variety of other suitable wireless telephone/data systems in addition to EV-DO including, but not limited to High Speed Packet Downlink Access ("HSPDA"), Code Division Multiple Access ("CDMA") 2000, Evolution-Data and Voice ("EV-DV"), and wideband CDMA.

In any given wireless telephone market, such as a typical metropolitan area, the wireless telephone system 10 may include one or more mobile communication devices, such as a mobile telephone 12a, a laptop computer 12b, a vehicle system 12c, and/or other user equipment 12d. The mobile devices 12a-12d may be configured to encode data received from a user and to transmit that data over a "reverse link" 16a-16d from the mobile devices 12a-d to a base transceiver station ("BTS") 14a-b. Similarly, the mobile devices 12a-12d may be configured to receive data from the BTS 14 over a "forward link" 18a-18d from the BTS 14a-d to the mobile devices 12a-d.

The BTSs 14a-b, which are also referred to as "base stations" or "access points," may control the allocation and release of specific radio resources to establish a connection to the mobile devices 12a-d. In one embodiment, the BTSs 14a-b may include one or more antennas, Rf transceivers, antenna interfaces, and controllers. The BTSs 14a-b may be configured to receive Rf signals containing sub-packets across the reverse link 18a-d from the mobile device 12a-d, and to convert these sub-packets from Rf signals back into packets. As described above, if the BTSs 14a-b are able to successfully produce a packet, the BTSs 14a-b may be configured to transmit an ACK signal back across the forward link 16a-d to the mobile device 12a-d that transmitted the sub-packets. Similarly, the BTSs 14a-b may also be configured to receive packetized data from a base station controller ("BSC") 20, and to break these received packets into sub-packets that can be transmitted to one of the mobile devices 12a-d across the forward link 16a-d until an ACK signal is received from the mobile device 12a-d. However, as will be described further below, in one embodiment, the mobile devices 12a-d and/or the BTSs 14a-b may be configured to dynamically adjust the maximum number of sub-packets that are transmitted in response to NAKs.

The BSC 20 may be configured to control the BTSs 14a-b and to manage the assignment of radio frequencies and channel assignments between the BTSs 14a-b. The BTS 20 may be coupled to a packet control function ("PCF") system 22 and a mobile switching center ("MSC") 24. In one embodiment, the BTS 20 may be configured to transmit high speed data to the PCF system 22 and to transmit low speed data and voice transmissions to the MSC 24. The PCF system 22 may be configured to manage the high speed transfer of packets to the Internet 28 via the packet data serving node ("PDSN") 26.

Similarly, the MSC 24 may be configured to manage the lower speed transfer of packets to the Internet 28 via an Interworking Function ("IWF") system 30. In addition, the MSC 24 may also be configured to route requests for service between the BSC 20 and a public switched telephone network ("PSTN") 32, is often referred to as a land line telephone network. As such, the MSC 12 may include a number of devices, such as computerized call routers, control switching functions, call processing, channel assignments, data interfaces, tracking, paging, call handoff, and user billing.

One or more the embodiments described herein may be directed towards systems and/or methods for dynamically adjusting the maximum number of Hybrid ARQ transmissions between the mobile devices 12a-d and the BTSs 14a-b. As will be described further below, the techniques described below may be employed by either the mobile devices 12a-d or the BTSs 14a-b or both. As such, even though the description below will be described below in terms of transmitters and receivers, it will be appreciated that the transmitter may be one of the mobile devices (12a, for example) and the receiver may be one of the BTSs (14a, for example) or vice-versa.

As described above, the transmitter and receiver employ Hybrid ARQ ("H-ARQ") so that for each encoded packet, the transmitter may send at least M sub-packets. Consecutive sub-packets are separated by sufficient intervals to allow the receiver to send a positive or negative acknowledgement. The acknowledgement may be explicit or implicit (e.g., the absence of a transmission indicating either ACK or NAK based on the established convention). The transmitter may use the intervals between the sub-packets that belong to the same packet to send different packets to the same or different receivers. In one embodiment, the transmissions may be arranged using fixed slot/frame interlaces so that the sub-packets of the same packet must be transmitted using every k-th slot/frame (synchronous H-ARQ). Alternatively, in another embodiment (asynchronous H-ARQ) only a minimum separation between sub-packets needs to be specified, but the transmission of sub-packets of the same packet may occur in any slot/frame as long as this minimum separation is satisfied.

For the purpose of the discussion below, it will be assumed that source application, such as a VoIP encoder in the transmitter, generates packets regularly (e.g., every t ms on average), and that the quality of service ("QoS") parameters of the source application are such that packet delay/jitter must be kept with certain bounds for adequate service. These QoS parameters result in a condition where any substantial queuing of packets at the transmitter due to the unavailability of transmission slots/frames should preferably be avoided. This preference can be achieved by restricting H-ARQ transmissions such that only those H-ARQ transmissions that can be completed within a time less than or equal the period of t are transmitted.

One conventional technique for accomplishing this goal is to set the power and rate control parameters such that the H-ARQ transmissions extend beyond the time t less than 1% of the time. For example, if the H-ARQ transmissions start to extend beyond the time t for more than 1% of the time, the transmitter can boost the transmission power until the percentage returns to less than 1%.

Unfortunately, however, when transmission conditions are sufficiently degraded, merely adjusting the power and/or rate control loop may not be able to achieve the low target error performance. In addition, under some circumstances, the ACK/NAK feedback from the receiver could itself experience a significant degradation causing ACKs sent by the receiver to be mistaken by the transmitter for NAKs. Consequently, the transmitter, unaware of the successful transmission, may continue sending additional H-ARQ sub-packets even though the receiver has already successfully received the encoded packet. Either of these conditions may result in substantial queuing at the transmitter as new packets are generated at a faster rate than they can be sent over the air. The queuing can, in turn, lead to an unacceptable quality of service for real-time applications such as voice/video telephony.

Some of the conditions that may lead to degraded ACK/NAK transmissions include overload conditions on the signaling channel used to transmit ACK/NAK feedback. In particular, a feedback channel on the forward link of an EV-DO system uses code-division multiplexing to send ACK/NAK to all users sending reverse link H-ARQ packets. The individual ACK/NAK transmissions are allocated power fractions such that the aggregate power of all signaling channels transmitted simultaneously cannot exceed the maximum base station power. When there are a large number of users sending data over the link, the power allocations may exceed the aggregate power budget. In this case, some or all of the allocations may be scaled down to fit within the power budget or omitted entirely (in this case the absence of feedback transmission would be interpreted as NAK). Further, a similar situation may arise in the case where time multiplexing is used to allocate feedback channel resources.

Other reasons for ACK/NAK feedback degradation may include coverage issues resulting in forward/reverse link imbalance (degraded feedback link paired with good link used for packet transmission), or one of the mobile device 12a-d reaching its maximum transmission power limit and deciding to scale or omit feedback signaling to save power.

Degraded power/rate control loop performance may also occur under heavy load or due to coverage problems. For example, when the mobile devices 12a-d do not have enough power to transmit at the allocated packet rate (due to coverage hole, deep fade or interference rise in the system 10), the mobile device 12a-d may scale down the traffic-to-pilot ratio leading to the lower than the target performance. If some sub-packets have been subjected to scaling down of the traffic-to-pilot power ratio during the packet transmission, the number of sub-packets required accomplishing the Hybrid ARQ process increases beyond the target number. Moreover, degradation of transmission performance of power/rate control signaling information itself may also cause this condition.

Figure 2:
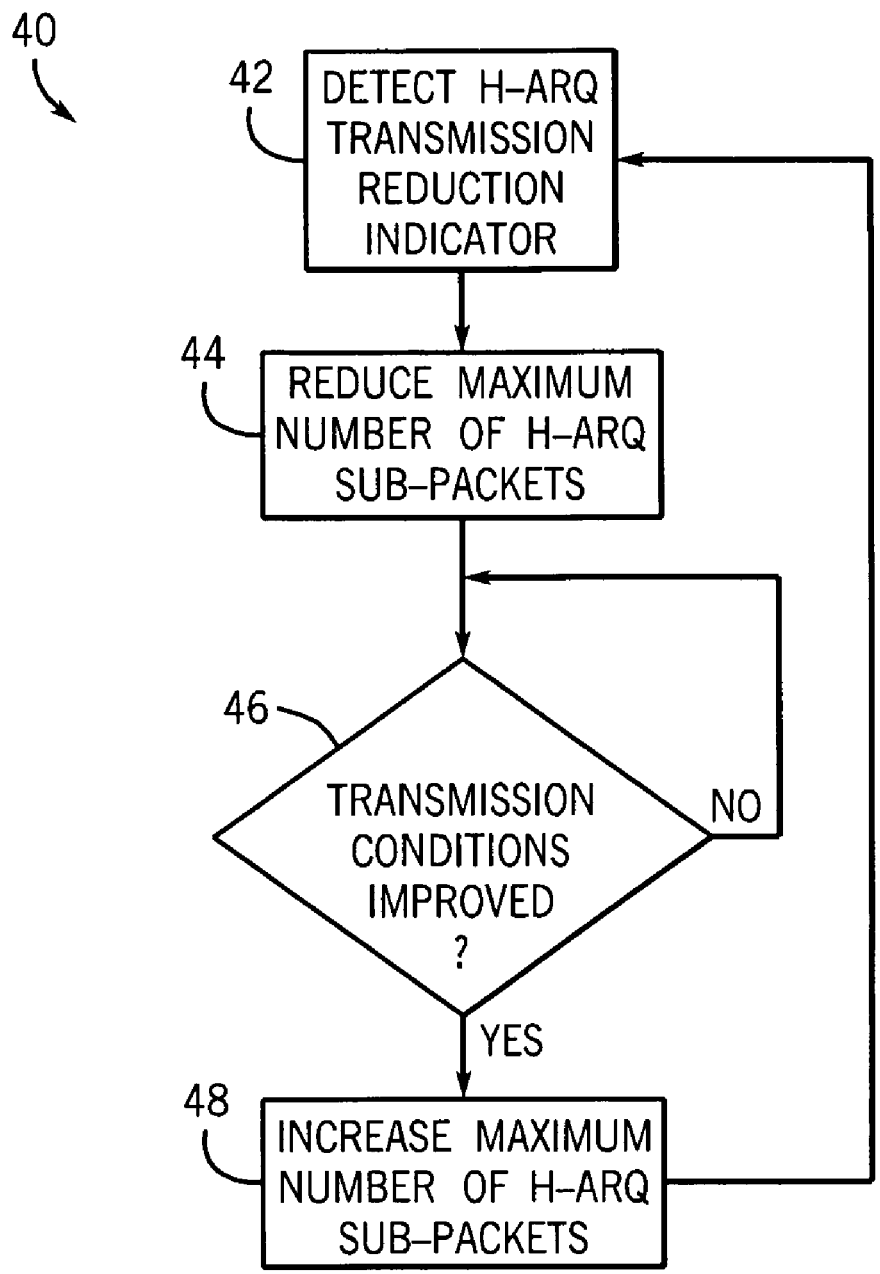
FIG. 2 is a flow chart illustrating an exemplary technique for dynamically adjusting the number of Hybrid ARQ transmissions in accordance with one embodiment.

As such, in one embodiment, the transmitter is configured to dynamically adjust the maximum number of H-ARQ transmissions as a function of the estimated feedback channel performance variation, traffic channel performance, and/or the resulting probability of packet queuing. For example, in one embodiment, the transmitter may adjust the number of H-ARQ transmissions when the transmitter detects that the Rf conditions have degraded such that the feedback channel is very likely to be interpreted as NAK even though the ACK is intended. Accordingly, FIG. 2 is a flow chart illustrating an exemplary technique 40 for dynamically adjusting the maximum number of H-ARQ transmissions in accordance with one embodiment. In one embodiment, one of the BTSs 14a-b may be configured to execute the technique 40. In another embodiment, one or more of the mobile devices 12a-d may be configured to execute the technique 40. In still other embodiments, other suitable components of the system 10 may be configured to execute the technique 40.

As indicated by block 42 of FIG. 2, the technique 40 may begin with the transmitter (the BTS 14a, for example) detecting a H-ARQ transmission reduction indicator. More specifically, in various embodiments, there are a variety of suitable indicators that could trigger a reduction of the maximum number of allowed H-ARQ sub-packet transmissions by the transmitter. For example, H-ARQ transmission reduction may be indicated if there is a build-up of the transmission queue of an application flow with strict delay requirements, such as VoIP. In one embodiment, this indicator could be detected by measuring average queue size. In another embodiment, this indicator could be detected by detecting whether an average arrival rate to the transmission queue exceeds an average departure rate from the queue. In yet another embodiment, the indicator may be detected if there is increase over 1% of the actual number of sub-packet transmissions above a default termination target number N.

In yet another embodiment, the transmitter may detect the H-ARQ transmission reduction indicator by detecting degraded performance of the link in the direction of feedback channel. For example, in the case of the BTS 14a, the BTS 14a could detect degraded Rf performance on the reverse link 18a between the mobile device 12a and the BTS 14a. In another embodiment, the transmitter could evaluate the performance of the link by comparing observed error rates of various information or signaling packets sent in the same direction to their respective target error rates.

After the transmitter has detected the H-ARQ transmission reduction condition, the transmitter may reduce the maximum number of H-ARQ sub-packets that it transmits for each packet, as indicated by block 44. For example, the transmitter may reduce the maximum number of H-ARQ sub-packets from a first level (M) to a second level (N) such that N is less than or equal to t/T where t is the packet generation time and T is sub-packet transmission time. In this embodiment, even if the feedback loop were inactive or mis-detected, new packets would not stay in the transmitter's transmission queue longer than the average arrival interval for new packets.

In one embodiment, reducing the maximum number of H-ARQ sub-packets may include reducing the maximum number of H-ARQ sub-packets associated with a packet generated by a first application but not the maximum number of H-ARQ sub-packets associated with a packet generated by a second application, wherein the first application has different QoS parameters than the second application. For example, the transmitter may be configured to reduce the maximum number of H-ARQ sub-packets that can be transmitted for packets with a one set of stricter QoS parameters, such as voice-over-IP, interactive video, and/or gaming packets while not reducing the maximum number of H-ARQ sub-packets for packets with less strict QoS parameters, such as e-mail.

When the conditions change such that the estimated feedback performance and/or the traffic channel performance returns within acceptable bounds (block 46), the maximum number of allowed H-ARQ sub-packet transmissions can be increased above N and ultimately all the way up to M, as indicated by block 48. In one embodiment, the transmitter may be configured to apply an appropriate hysteresis to avoid ping-ponging in the execution of the technique 40. In this embodiment, a gradual or abrupt increase of the maximum number of sub-packet transmissions up to the default value of M is initiated in block 48.

Lastly, the technique 40 may cycle back to block 42 to await another transmission quality degradation. It will be appreciated that if the transmitter detects that an adjustment in the maximum number of H-ARQ sub-packets is required, it may not need to inform the mobile device 12a about the change if the protocol used for H-ARQ sub-packet identification allows such operation. In this case the transmitter can just enforce the sub-packet limit locally by not transmitting more than N sub-packets for each packet whether or not the ACK is received after the Nth transmission.

Figure 3:
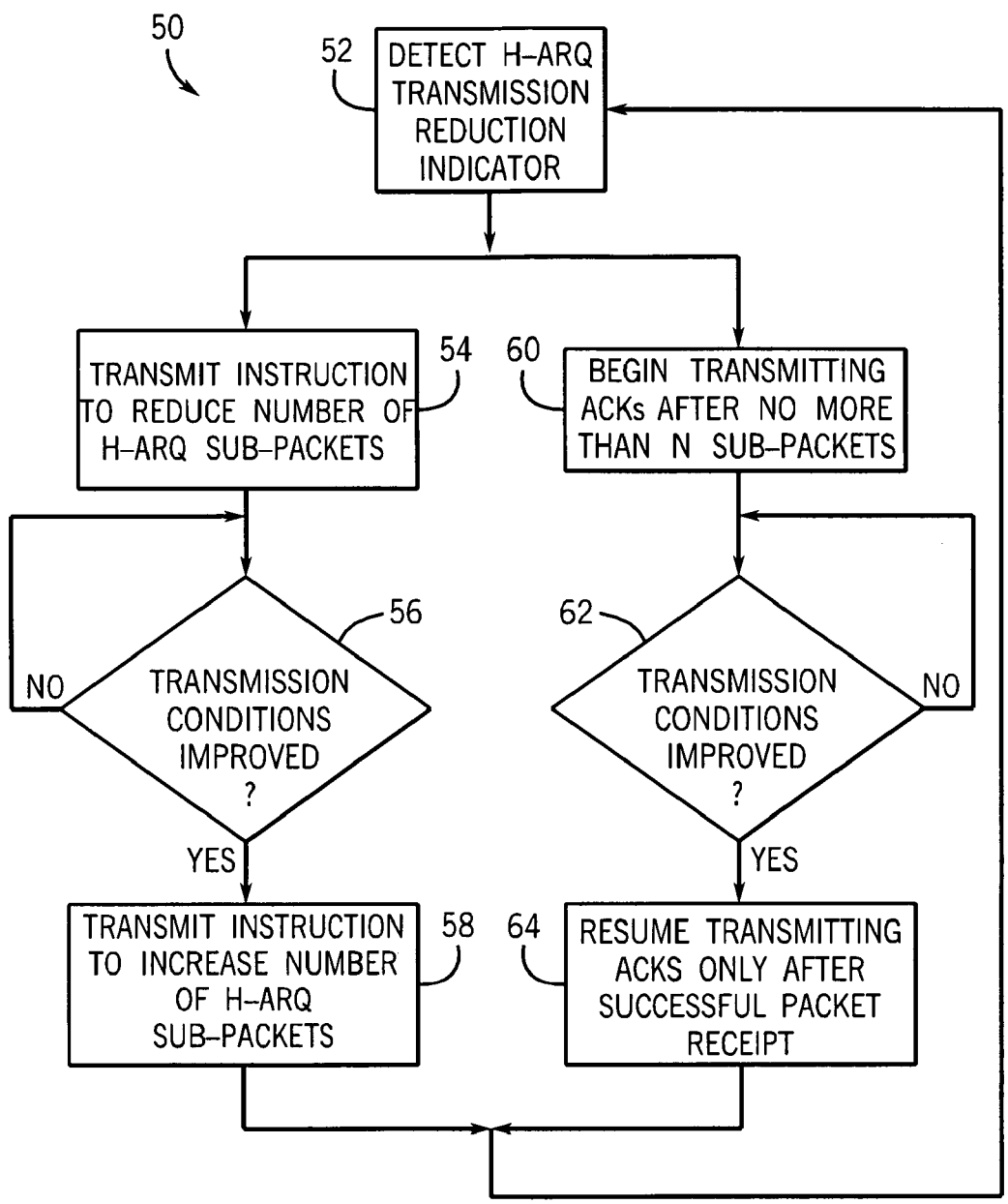
FIG. 3 is a flow chart illustrating another exemplary technique for dynamically adjusting the number of Hybrid ARQ transmissions in accordance with one embodiment.

In another embodiment, the receiver (the mobile device 12a for example) may be configured to detect the H-ARQ reduction indicator and to notify the transmitter to reduce the maximum number of H-ARQ sub-packets. For example, FIG. 3 is a flow chart illustrating another exemplary technique 50 for dynamically adjusting the maximum number of H-ARQ transmissions in accordance with one embodiment. In one embodiment, one or more of the mobile devices 12a-d may be configured to execute the technique 50. In another embodiment, one of the BTSs 14a-b may be configured to execute the technique 50. In still other embodiments, other suitable components of the system 10 may be configured to execute the technique 50.

As illustrated by block 52 of FIG. 3, the technique 50 may begin with the receiver detecting a H-ARQ transmission reduction condition. There are a variety of suitable conditions that can trigger a reduction of the maximum number of allowed H-ARQ sub-packet transmissions at the receiver, such as the mobile device 12a. In one embodiment, the receiver may detect the H-ARQ transmission reduction indicator when the receiver detects overloading of a signaling channel resulting in frequent or consistent scaling down or omission of resource allocation for the ACK/NAK feedback channel. In one embodiment, the frequency or consistency of the scaling down is measured with an appropriate moving averaging, with filtering, and/or with counting the occurrence of such conditions over a specified period of time.

In another embodiment, the receiver may be configured to detect the H-ARQ transmission reduction indicator if the receiver detects degraded performance of the link in the direction of feedback channel. In one embodiment, the receiver may be configured to detect this indicator based on the power/rate control information related to this link direction. For example, the receiver may examine the power/rate control commands from the transmitter to the receiver that request consistent increases in power, and/or reductions in data rate. In addition, the receiver may detect indications from the transmitter that the link is overloaded (e.g., using special activity bit signaling).

In yet another embodiment, the receiver may be configured to detect the H-ARQ transmission reduction indicator if the receiver detects a significant increase in redundant sub-packet transmissions to the receiver. More specifically, the receiver may detect sub-packets that are received after the successful reception of the packet they belonged to have been acknowledged. The transmission of redundant sub-packets may indicate that the ACK sent for the earlier sub-packet of the same packet has been interpreted as NAK due to degradation or breakage of feedback channel.

In still another embodiment, the receiver may be configured to detect the H-ARQ transmission reduction indicator if the receiver detects significant degradation of the H-ARQ performance as evidenced by the inability of power/rate control by the transmitter to achieve target error performance at the target number of sub-packet transmissions. Even though this inability could also be due to coverage problems and/or system overload in the direction of H-ARQ transmission, it may still be better for many applications to limit the maximum packet latency though the reduction of maximum number of allowed H-ARQ sub-packets.

After the receiver has detected the H-ARQ transmission reduction condition, the receiver may transmit an instruction to its transmitter instructing the transmitter to reduce the maximum number of H-ARQ sub-packets, as indicated by block 54. For example, the receiver may instruct the transmitter to reduce the maximum number of H-ARQ sub-packets from a first level (M) to a second level (N) such that N is less than or equal to t/T where t is the packet generation time and T is sub-packet transmission time. In this embodiment, even if the feedback loop were inactive or mis-detected, new packets would not stay in the transmitter's transmission queue longer than the average arrival interval for new packets.

When the conditions change such that the estimated feedback performance and/or the traffic channel performance return within acceptable bounds (block 56), the receiver may transmit an instruction to the transmitter instructing the transmitter to increase the maximum number of allowed H-ARQ sub-packet transmissions above N and ultimately all the way up to M, as indicated by block 58. In one embodiment, the receiver may be configured to apply an appropriate hysteresis to avoid ping-ponging in the application of the technique 50. In this embodiment, a gradual or abrupt increase of the maximum number of sub-packet transmissions up to the default value of M is initiated in block 58.

Alternatively or in combination with blocks 54-58, the receiver may also be configured to autonomously attempt to reduce the number of H-ARQ sub-packets by transmitting ACKs after every Nth sub-packet regardless of whether or not the receiver has successfully decoded the transmitted packet, as indicated in block 60. When the conditions change such that the estimated feedback performance and/or the traffic channel performance return within acceptable bounds (block 62), the receiver may resume transmitting ACKs only after the successful transmission of a packet, as indicated by block 64.

In addition, in one embodiment, when the link is operating with a reduced number of sub-packet transmissions such that the queuing of new packets by the transmitter is virtually prevented, the receiver may also choose to completely disable ACK/NAK feedback. Disabling ACK/NAK feedback may help to alleviate overload of the ACK/NAK signaling channel, which may have caused the degraded feedback performance. Disabling the ACK/NAK feedback may allow the transmission resources that were being used for ACK/NAK feedback to be used for other purposes, such as power control or signaling, which are potentially important for stable system operation. Alternatively, in yet another embodiment, instead of completely disabling the ACK/NAK feedback channel, the receiver may change the resource allocation priority of the ACK/NAK feedback to a lower value, such that ACK/NAK feedback is allocated after other signaling channels sharing the same resource are allocated.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method comprising:
   generating a plurality of hybrid ARQ sub-packets associated with a packet, wherein a transmitter is configured to transmit up to a maximum number of the hybrid ARQ sub-packets;
   detecting a degradation in transmission quality; and
   in response to detecting the degradation, reducing the maximum number of hybrid ARQ sub-packets associated with the packet that can be transmitted by the transmitter.

2. The method, as set forth in claim 1, wherein reducing the maximum number of hybrid ARQ sub-packets comprises reducing the maximum number of hybrid ARQ sub-packets associated with a packet generated by a first application but not the maximum number of hybrid ARQ sub-packets associated with a packet generated by a second application, wherein the first application has different quality of service parameters than the second application.

3. The method, as set forth in claim 1, wherein reducing the maximum number of hybrid ARQ sub-packets comprises reducing the maximum number of hybrid ARQ packets associated with an interactive video application.

4. The method, as set forth in claim 1, wherein reducing the maximum number of hybrid ARQ sub-packets comprises reducing the maximum number of hybrid ARQ sub-packets from a first level to a second level, wherein the second level is less than or equal to a packet generation time divided by a sub-packet transmission time.

5. The method, as set forth in claim 1, wherein the detecting comprises detecting a degradation in radio frequency condition.

6. The method, as set forth in claim 1, wherein the detecting comprises determining that a total transmission time for the sub-packets associated the packet is longer than a packet generation time.

7. The method, as set forth in claim 1, wherein the detecting comprises detecting degraded performance of a link in a direction of a feedback channel.

8. The method, as set forth in claim 1, wherein the detecting comprises detecting an overload of a signaling channel resulting in omission of resource allocation for an acknowledgement/non-acknowledgement feedback channel.

9. The method, as set forth in claim 1, wherein the detecting comprises detecting an increase in redundant sub-packet transmissions to a receiver.

10. The method, as set forth in claim 1, wherein reducing the maximum number of hybrid ARQ sub-packets comprises sending an instruction to the transmitter directing the transmitter to reduce the maximum number of hybrid ARQ sub-packets.

11. The method, as set forth in claim 1, comprising:
    detecting an improvement in the transmission quality; and
    in response to detecting the improvement, increasing the maximum number of hybrid ARQ sub-packets associated with the packet that can be transmitted by the transmitter.

12. A method comprising:
    detecting a degradation in transmission quality;
    receiving a sub-packet transmission from a transmitter, wherein the sub-packet is one of a plurality of sub-packets associated with a packet; and
    sending an acknowledgement to the transmitter if at least a predetermined number of sub-packets associated with the packet have been received, wherein the acknowledgement is sent regardless of whether the packet was successfully decoded.

13. The method, as set forth in claim 12, wherein detecting the degradation in transmission quality comprises detecting an increase in the number of sub-packets received that are associated with packets that have already been successfully decoded.

14. The method, as set forth in claim 12, comprising sending an instruction to the transmitter directing the transmitter to reduce the maximum number of hybrid ARQ sub-packets that can transmitted for each packet.

15. The method, as set forth in claim 12, wherein sending the acknowledgement to the transmitter comprises sending an ACK over a feedback channel to the transmitter after a number of received hybrid ARQ sub-packets equals approximately a packet generation time divided by a sub-packet transmission time.

16. A hybrid ARQ enabled device configured to:
generate a plurality of hybrid ARQ sub-packets associated with a packet, wherein a transmitter is configured to transmit up to a maximum number of the hybrid ARQ sub-packets;
detect a degradation in transmission quality that affects the transmitter; and
reduce the maximum number of hybrid ARQ sub-packets associated with the packet that can be transmitted by the transmitter in response to detecting the degradation.

17. The device, as set forth in claim 16, wherein the device is configured to reduce the maximum number of hybrid ARQ packets associated with packets transmitted with a voice-over-P application.

18. The device, as set forth in claim 16, wherein the device is configured to reduce the maximum number of hybrid ARQ sub-packets from a first level to a second level, wherein the second level is less than or equal to a packet generation time divided by a sub-packet transmission time.

19. The device, as set forth in claim 16, wherein the device comprises a wireless base station.

20. The device, as set forth in claim 16, wherein the device comprises a wireless data device.

21. A method comprising:
detecting a degradation in transmission quality; and
adjusting a resource allocation priority of acknowledgement/non-acknowledgement feedback from a receiver in response to detecting the degradation, wherein adjusting the resource allocation priority comprises allocating a transmission resource for transmission of the acknowledgement/non-acknowledgement feedback subsequent to the allocation of the transmission resource for a signaling channel.

22. A method comprising:
detecting a degradation in transmission quality; and
adjusting a resource allocation priority of acknowledgement/non-acknowledgement feedback from a receiver in response to detecting the degradation, wherein adjusting the resource allocation priority comprises disabling the transmission of acknowledgements and non-acknowledgements from the receiver in response to detecting the degradation.

* * * * *